United States Patent
Larjola

(10) Patent No.: US 6,450,780 B1
(45) Date of Patent: Sep. 17, 2002

(54) METHOD FOR GENERATING OVER-PRESSURE GAS

(75) Inventor: Jaakko Larjola, Mantyharju (FI)

(73) Assignee: Sundyne Corporation, Arvarda, CO (US)

( * ) Notice: Subject to any disclaimer, the term of this patent is extended or adjusted under 35 U.S.C. 154(b) by 0 days.

(21) Appl. No.: 09/555,711

(22) PCT Filed: Dec. 2, 1998

(86) PCT No.: PCT/FI98/00938

§ 371 (c)(1),
(2), (4) Date: Jul. 17, 2000

(87) PCT Pub. No.: WO99/31390

PCT Pub. Date: Jun. 24, 1999

(30) Foreign Application Priority Data

Dec. 3, 1997 (FI) .................................................. 974401

(51) Int. Cl.[7] .............................................. F04B 35/00
(52) U.S. Cl. .......................... 417/350; 417/53; 417/365; 415/104
(58) Field of Search ................................ 417/350, 365, 417/423.5, 423.12, 53; 415/104, 106, 107; 310/166

(56) References Cited

U.S. PATENT DOCUMENTS

| | | | | |
|---|---|---|---|---|
| 4,057,369 A | | 11/1977 | Isenberg et al. ............. 417/365 |
| 4,523,896 A | * | 6/1985 | Lhenry et al. ............... 417/244 |
| 4,602,873 A | * | 7/1986 | Izumi et al. .................. 384/99 |
| 4,609,332 A | | 9/1986 | Miki et al. ................... 417/352 |
| 4,945,296 A | * | 7/1990 | Satake ......................... 318/538 |
| 5,065,590 A | * | 11/1991 | Powell et al. ................. 62/175 |
| 5,127,792 A | * | 7/1992 | Katsuta et al. .............. 415/104 |
| 5,248,239 A | * | 9/1993 | Andrews ..................... 415/104 |
| 5,473,211 A | * | 12/1995 | Arkkio ........................ 310/166 |
| 5,795,138 A | * | 8/1998 | Gozdawa ..................... 417/243 |
| 5,836,739 A | * | 11/1998 | Haramura et al. ........... 415/104 |
| 6,050,780 A | * | 4/2000 | Hasegawa et al. ......... 417/44.11 |

FOREIGN PATENT DOCUMENTS

| | | |
|---|---|---|
| EP | 0667934 | 4/1998 |
| WO | 9100122 | 11/1991 |
| WO | 9301900 | 3/1994 |
| WO | 9400319 | 12/1994 |

\* cited by examiner

Primary Examiner—Charles G. Freay
Assistant Examiner—Han L Liu

(57) ABSTRACT

The invention relates to a method for generating over-pressure gas by means of a kinetic compressor which is coupled to a high-speed electric machine located on the same shaft with the compressor and comprising a rotor whose rotational speed is over 20,000 rpm. The compressor is provided with at least two stages. The shaft of the rotor is mounted on a magnetic and/or gas bearings, and the high-speed electric machine is placed centrally on the shaft with respect to the compressor stage of the compressor. The rotor is mounted on a magnetic bearing at least in the axial direction, and the ends of the rotor are used at least partly as counter surfaces for the axial magnetic bearing.

7 Claims, 1 Drawing Sheet

METHOD FOR GENERATING OVER-PRESSURE GAS

Figure 1:
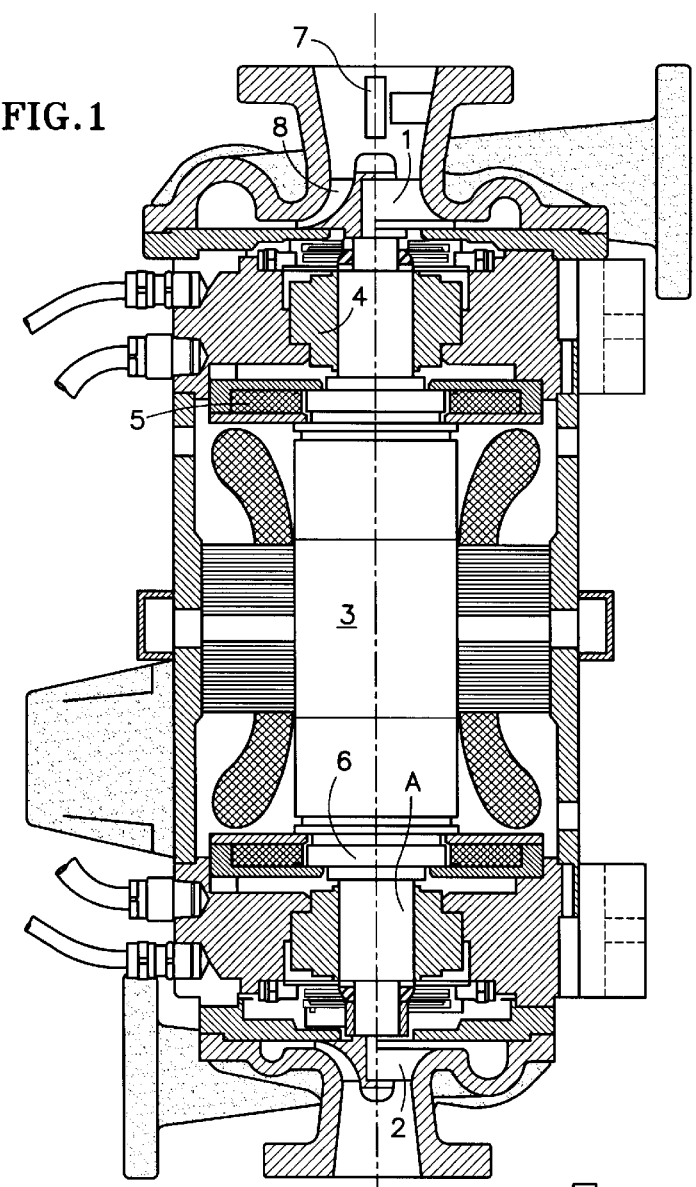

The invention relates to a method defined more closely in the preamble of the claim 1, for generating over-pressure gas, especially pressurized air.

In industry, when repairing buildings etc, pressurized air is required in which the pressure is typically within the order of 7 to 10 bar of over-pressure. To generate this pressurized air, piston or screw compressors are conventionally used which are usually oiled. The aim is to separate oil mist from the pressurized air with which it is mixed, but at least some oil remains in the pressurized air and thus ends up in the environment. Conventional piston or screw compressors are large in size, heavy, and often also noisy. They require maintenace relatively often, and especially in uncooled screw compressors, the operating efficiency is often poor.

Kinetic compressors have conventionally been used to produce pressurized air in the above-described manner only if the amount of air required has been substantial, for otherwise it would have been necessary to use a very high rotational speed. It is difficult to generate a very high rotational speed with an overdrive gear; the overdrive gear becomes expensive and is liable to failures.

U.S. Pat. No. 5,065,590 presents a cooling apparatus using a small-sized high-speed centrifugal compressor. This compressor is driven with an electromotor, whose rotor shaft is equipped with compressor stages. In between the compressor stages there is an intermediate cooler. This compressor shaft according to the patent publication is supported with ball bearings in which one drawback is, for instance, that they require heavy oiling at high speeds; otherwise the friction in them causes the bearings to heat up and wear down rapidly.

International patent application WO 94/29597 presents a cooling compressor of a centrifugal type. This compressor comprises one or more compressor stages, an electromotor, and a shaft which is supported with radial bearings, such as magnetic or gas bearings. Furthermore, the shaft is provided with axial locating means. To control the function of these locating means, the compressor is equipped with sensors, by means of which the location of the rotor at a given time can be detected.

In kinetic compressors of prior art, the rotational speed of the electromotor can be maintained substantially constant. The pressure and output of the compressor are adjusted by means of adjustable guide vanes.

The present invention relates to a method which is implemented with a device which generates pressurized air with a very rapidly rotating kinetic compressor based on high-speed technology. In this context, high speed technology denotes that the rotor unit is directly coupled to a high-speed electric machine, which is supplied with the necessary frequency generated by an inverter. Because the device applying the invention is not equipped with an overdrive gear, it is possible to use very high rotational frequencies witout problems. Preferably, the inverter is provided with a control logic for the compressor.

To attain the aforementioned purposes, the method according to the invention is primarily characterized in what will be presented in the characterizing part of the appended claim 1.

The other independent claims present some advantageous embodiments of the invention.

Figure 2:
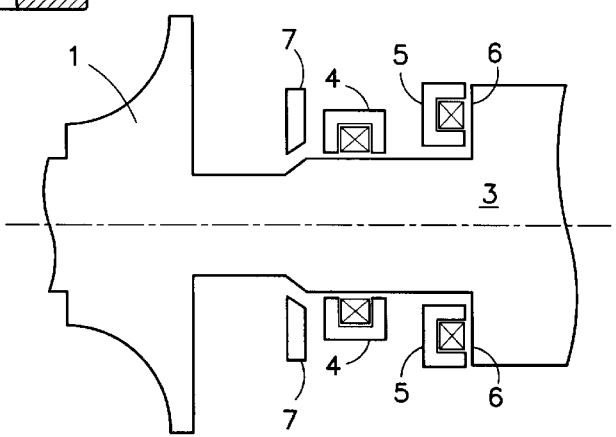

In the following specification, the invention will be described in more detail with reference to the appended drawings, in which FIG. 1 shows a longitudinal cross-section of a combination of a compressor and a high-speed electric machine applying the method according to the invention, and FIG. 2 shows a reduced cross-section of the bearing application in a combination of a compressor and a high-speed electric machine applying the method according to the invention.

As shown in the drawing, the kinetic compressor according to the invention is usually of the so-called radial compressor type, because it is considerably less expensive than an axial compressor. The operating efficiency of the radial compressor is at its best, when its so-called non-dimensional rotational speed $N_s$ is in the order of $0.5 < Ns < 1.1$. The non-dimensional rotational speed $N_s$ is specified in the following way:

$$N_s = \frac{2 \cdot \pi \cdot n \cdot \sqrt{Qv}}{\Delta h_s^{0.75}}$$

Here n equals the rotational speed (1/s), Qv equals the suction volume flow (m³/s), and $\Delta h_s$ equals the isentropic rise in enthalpy required for air compression. The equation shows that the smaller the volume flow, the higher the rotational speed required to attain a particular $N_s$ value, i.e. a substantial operating efficiency. On the other hand, the equation shows that the required rotational speed can be reduced if the compression is divided into several radial compressor stages, wherein the stage-specific $\Delta h_s$ used in the equation is reduced.

Instead of one or more radial compressor stages, it is also possible to use so-called mixed flow axial and radial compressors. In such compressors, the vanes of the compressor impeller are designed in such a way that they generate both an axial and a radial flow. The use of the mixed flow compressor often leads to a high value of output/rotational speed. To improve, the power transfer ratio, advantageously the first compressor impeller can be arranged to be of the mixed flow type, wherein the second and the possible third compressor impeller can be set to operate at a higher non-dimensional rotational speed $N_s$. The mixed flow solution is advantageous when the non-dimensional rotational speed $N_s > 1.1$.

When producing pressurized air of the above kind, it is advantageous to divide the compression into at least two radial compressor stages, for otherwise the relative velocities in the radial compressor rise so high that it affects the power transfer ratio, and, furthermore, the rotational speed rises unnecessary high, as can be seen in the equation above. Moreover, the power consumption of the entire compressor can be considerably reduced by cooling compressed air between the stages.

For example, if the aim is to produce 8.0 bar of over-pressurized air 0.7 kg/s, the necessary rotational speed in a two-stage radial compressor is approximately 70,000 rpm, and in a three-stage radial compressor approximately 60,000 rpm. The two-stage radial compressor is the most advantageous alternative, because it only requires one shaft A whose first end comprises the first radial compressor stage 1 and the second end the second radial compressor stage 2, the rotor 3 of the high-speed electric machine being placed on the shaft A between the first stage 1 and the second stage 2. The necessary shaft output is approximately 200 kW.

The necessary output/rotational speed combination of 200 kW/70,000 rpm is, however, a substantial requirement for an electric machine: it is tenfold when compared with the performance characteristics of a conventional squirrel-cage induction motor. As for bending vibrations, said common compressor-electric machine rotor 1-3-2 is advantageously subcritical, for balancing and stabilizing, a supercritical rotor 3 at said rotational speed could become expensive. The supercritical feature is not, however, such a big problem if magnetic bearings are used in the bearing application. The necessary requirements can be fulfilled by using as the electric machine a high-speed squirrel-cage induction motor, known as such and equipped with a copper-coated massive rotor. One such high-speed motor construction is presented in the Finnish patent FI-92114 by the applicant, and it can be advantageously applied in the compressor according to the present invention. The high-speed motor is composed of a rotor which rotates in relation to the stator and conducts electricity, wherein an air gap is formed between the rotor and the stator, the size of the air gap complying substantially with the equation $$\delta = \frac{D_s - D_r}{2} > A + \frac{D_r}{B} + \frac{\pi}{C}$$

in which equation $D_r$=the outer diameter of the rotor (mm),
$D_s$=the inner diameter of the stator (mm),
u=peripheral speed (m/s),
$\delta$=the air gap (mm),
A=a constant, the value of which $\geq 0.3$, advantageously 0.7 . . . 1.5, preferably 1,
B=a constant, the value of which $\leq 150$, advantageously 50 . . . 100, preferably 70,
C=a constant, the value of which $\leq 1200$, advantageously 300 . . . 600, preferably 400; in m/s/mm.

Furthermore, in the high-speed motor according to the invention, the peripheral speed exceeds 100 m/s.

In order to maintain the compressor-electric machine rotor 1-3-2 shared by the compressor 1,2 and the rotor 3, in a subcritical state, the shaft gudgeons have to be relatively thick. Thus, it is advantageous to use gas or magnetic bearings which are also oil-free and nearly maintenance-free.

When comparing the above-described two-stage compressor which has gas or magnetic bearings and is based on a high-speed electric machine, with conventional solutions, for example the following advantages are achieved:

1) Completely oil-free pressurized air.
2) Small and light structure.
3) Substantial operating efficiency even under exceptional operating conditions, and continuous operation in the normal range of use thanks to the rotational speed adjustment.
4) Long technical lifetime and nearly maintenance-free function thanks to the contact-free operation.
5) Furthermore, according to section 3), a pressurized air storage tank required by conventional compressors is unnecessary if the need for pressurized air remains within the normal range of use, or if blow-out is allowed with pressurized air quantities smaller than the range of use.

Within the normal range of use, which is typically from 70 to 100% in the rated flow, the above-described kinetic compressor is adjusted by altering the rotational speed in such a way that the pressure desired by the user can be maintained. If the desired flow is smaller than the aforementioned lower limit (70%), either the compressor is driven on intermittent duty (wherein a pressurized air storage tank is required) or the exhaust valve is opened according to the need. A third alternative is to equip both compressor stages 1, 2 with a valve, which can be used to circulate some of the air compressed by an axial inducer part 8 of the impeller back to the suction. In this way it is possible to set the compressor to operate without surge with quite a small volume flow.

Finally, we can examine some structural solutions which are advantageous in the above-described high-speed compressor. As a radial bearing 4 it is advantageous to use a dynamic gas bearing of a tilting pad type, as in the embodiment of FIG. 1, or an active magnetic bearing, as presented in the schematic cross-sectional view of FIG. 2. As an axial bearing 5, it is advantageous to use an active magnetic bering whose counter surfaces 6 are provided by the ends of the electric machine rotor. In this way it is possible to attain the highest possible bending critical rotational speed of the compressor rotor.

The use of the active magnetic bearing 4, 5 requires the use of a location sensor 7. The location sensor 7 is used to define the location of the shaft at a given time in the axial and radial directions. On the basis of this information, the magnetic bearings are adjusted in a way known as such so that possible deviations of the shaft from the target position can be corrected. When determining the axial or radial location, it is possible to use separate location sensors, or such a location sensor which is capable of determining the location in both directions. The location sensor 7 is placed either close to the magnetic bearing next to the shaft (FIG. 2), or on the extension of the shaft of the first radial compressor rotor (FIG. 1). When using several location sensors 7, it is possible to use both said location alternatives. Thus, the location sensor placed next to the shaft is used advantageously to adjust the radial bearing, and the location sensor placed on the extension of the shaft of the radial compressor is used to adjust the axial bearing.

It is obvious that the present invention is not restricted solely to the embodiments presented above, but it can be modified within the scope of the appended claims.

What is claimed is:

1. Method for generating over-pressure gas by means of a kinetic compressor which is coupled to a electric machine located on a shaft with the compressor and comprising a rotor with a first end and a second end whose rotational speed is greater than 20,000 rpm, in which method the shaft is provided with magnetic bearings, the electric machine is placed centrally on the shaft with respect to a first compressor stage and a second compressor stage of the compressor, the rotor is mounted on a magnetic bearing at least in an axial direction and the magnetic bearing is selected to be of the active type, characterized in that at least one of the first and the second compressor stages is selected as a mix-flow compressor, the first and second ends of the rotor are used at least partly as counter surfaces for the magnetic bearing, that a squirrel-cage induction motor equipped with a coated rotor is used as the electric machine, and that the electric machine is supplied with a necessary frequency generated by an inverter.

2. Method according to claim 1, characterized in that at least one of the first and the second compressor stages is selected as a radial compressor.

3. Method according to claim 1, characterized in that the rotor is mounted on a magnetic bearing in a radial direction.

4. Method according to claim 1, characterized in that the rotor is mounted on a gas bearing in a radial direction.

5. Method according to claim 4, characterized in that the radial gas bearing is selected to be of a dynamic tilting pad bearing type.

6. Method according to claim 4, characterized in that a location sensor is placed on an extension of a shaft of the first or the second compressor stage to control the function of the axial magnetic bearing.

7. Method according to claim 1, characterized in that the operating range of the compressor is expanded by providing one or more compressor stages with a valve, which is used to circulate some air compressed by an axial inducer part of an impeller back into a suction inlet of the compressor.

* * * * *